US009487191B2

(12) United States Patent
Masuda et al.

(10) Patent No.: US 9,487,191 B2
(45) Date of Patent: Nov. 8, 2016

(54) BRAKE CONTROL DEVICE

(71) Applicants: ADVICS CO., LTD., Kariya, Aichi-pref. (JP); TOYOTA JIDOSHA KABUSHIKI KAISHA, Toyota-shi, Aichi-ken (JP)

(72) Inventors: Yoshio Masuda, Anjyo (JP); Hiroaki Niino, Toyota (JP); Kiyoyuki Uchida, Konan (JP); Yusuke Kamiya, Okazaki (JP); Masaaki Komazawa, Miyoshi (JP)

(73) Assignees: ADVICS CO., LTD., Kariya, Aichi-Pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/761,562

(22) PCT Filed: Jan. 14, 2014

(86) PCT No.: PCT/JP2014/050408
§ 371 (c)(1),
(2) Date: Jul. 16, 2015

(87) PCT Pub. No.: WO2014/115593
PCT Pub. Date: Jul. 31, 2014

(65) Prior Publication Data
US 2015/0360654 A1 Dec. 17, 2015

(30) Foreign Application Priority Data

Jan. 23, 2013 (JP) ................................. 2013-009989

(51) Int. Cl.
*B60T 13/10* (2006.01)
*B60T 7/04* (2006.01)
(Continued)

(52) U.S. Cl.
CPC .............. *B60T 7/042* (2013.01); *B60T 13/146* (2013.01); *B60T 13/662* (2013.01); *B60T 13/686* (2013.01); *B60T 8/4077* (2013.01)

(58) Field of Classification Search
CPC ........ B60T 7/042; B60T 8/40; B60T 8/4072; B60T 8/4077; B60T 13/10; B60T 13/142; B60T 13/145; B60T 13/146; B60T 13/148; B60T 13/66; B60T 13/662; B60T 13/686
See application file for complete search history.

(56) References Cited

U.S. PATENT DOCUMENTS

2009/0195057 A1  8/2009 Niino
2011/0285199 A1  11/2011 Ishida

FOREIGN PATENT DOCUMENTS

JP    2004-161174 A    6/2004
JP    2009-184379 A    8/2009
(Continued)

OTHER PUBLICATIONS

English machine translation of JP 2012-214091 A (Motoji).*
(Continued)

*Primary Examiner* — Robert A Siconolfi
*Assistant Examiner* — Vu Q Nguyen
(74) *Attorney, Agent, or Firm* — Buchanan Ingersoll & Rooney PC

(57) ABSTRACT

The brake control device applied to a hydraulic pressure braking force generating device having a driving hydraulic pressure generating device and a pilot hydraulic pressure generating device. The brake control device includes a judging portion which judges whether or not an operating amount of a brake operating member is equal to or less than a predetermined value and a pilot hydraulic pressure control portion which controls the pilot hydraulic pressure generating device to generate a preparatory hydraulic pressure in the pilot hydraulic pressure chamber which is larger than an atmospheric pressure set to a value so that a hydraulic pressure in the wheel cylinder is kept substantially to an atmospheric pressure level when the judging portion judges that the operating amount of the brake operating member is equal to or less than the predetermined value to suppress occurrence of brake dragging during non-braking operation with keeping the braking force responsiveness.

5 Claims, 9 Drawing Sheets

(51) Int. Cl.
  *B60T 13/14* (2006.01)
  *B60T 13/66* (2006.01)
  *B60T 13/68* (2006.01)
  *B60T 8/40* (2006.01)

(56) References Cited

FOREIGN PATENT DOCUMENTS

| JP | 2011-240873 A | 12/2011 |
|---|---|---|
| JP | 2012-214091 A | 11/2012 |
| JP | 2013-10505 A | 1/2013 |

OTHER PUBLICATIONS

International Search Report (PCT/ISA/210) mailed on Mar. 11, 2014, by the Japanese Patent Office as the International Searching Authority for International Application No. PCT/JP2014/050408.

* cited by examiner

CYLINDER OPENING SIDE ⟵⟶ CYLINDER BOTTOM SURFACE SIDE

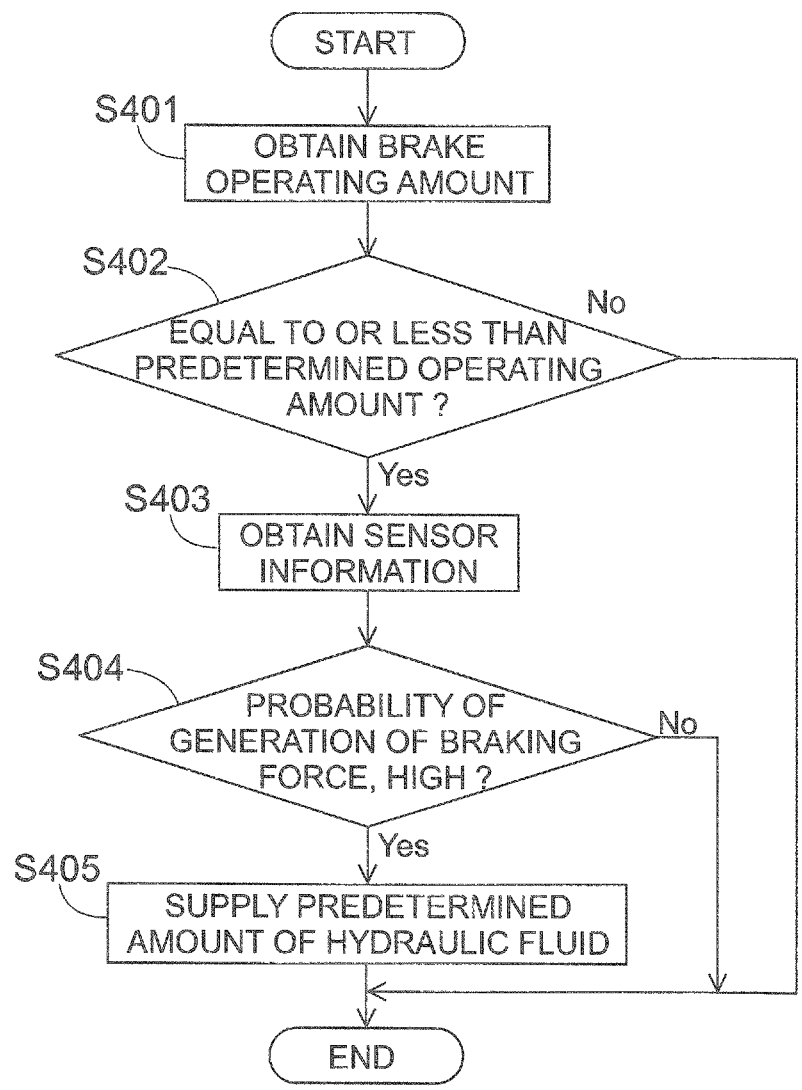

BRAKE CONTROL DEVICE

TECHNICAL FIELD

This invention relates to a brake control device which applies a target braking force to wheels of a vehicle.

BACKGROUND ART

Conventionally, a hydraulic pressure braking force generating device is known which applies a hydraulic pressure braking force to a vehicle wheel corresponding to a wheel cylinder by supplying the wheel cylinder with a brake fluid from the master cylinder. Generally, when a hydraulic pressure in a wheel cylinder (hereinafter referred to as "wheel hydraulic pressure") increases, a pair of brake pads corresponding to the wheel cylinder is brought into contact with a brake rotor and then the brake pad is pushed onto the brake rotor by the wheel pressure to perform an effective braking operation by the braking force. When the pressure is not generated in the wheel cylinder, the brake pad and the brake rotor are naturally separated from each other. Accordingly, until the brake pad is brought into contact with the brake rotor, the braking force is not effective to the brake performance in spite of the depression operation of the brake pedal by an operator of the vehicle. Accordingly, there is still a room for improving accuracy in change of braking force relative to the brake operation (hereinafter referred to as a "responsiveness of braking force").

Therefore, in order to improve the responsiveness of the braking force, a pre-charge technology has been developed and proposed, for example, for a brake control device disclosed in JP 2004-161174 A (Patent Literature 1) in which a predetermined pressure is applied in the wheel cylinder in advance. According to this technology, by obtaining the wheel hydraulic pressure (brake pressure) using a pressure sensor, a predetermined pre-charged pressure has been generated in the wheel cylinder.

CITATION LIST

Patent Literature

Patent Literature 1: JP2004-161174 A

SUMMARY OF INVENTION

Technical Problem(s)

However, there is a difference in pressure between the wheel hydraulic pressure obtained by the pressure sensor (hereinafter referred to as a "detected value of the wheel hydraulic pressure") and the actual pressure (hereinafter referred to as an "actual value of the wheel hydraulic pressure"). Further, there is a deviation in the detected values of the wheel hydraulic pressure due to the piece-to-piece variations among the individual pressure sensors. Further, there is a deviation in separation distance between the brake pad and the brake rotor due to the piece-to-piece variations among the individual disc brake devices. Accordingly, when a control for generating a pre-charged pressure in the wheel cylinder based on the detected value of the wheel hydraulic pressure is performed, due to the above deviations and variations, an excess pre-charged pressure may be generated, which makes a contact between the brake pad and the brake rotor to generate unnecessary braking force (dragging phenomenon). Accordingly, it was necessary to set a relatively low pre-charged pressure, considering the above deviations and variations. Thus, it would have been very difficult to satisfy both the improvement in responsiveness of braking force and the suppression of the generation of dragging phenomenon.

Further, the separation distance between the brake pad and the brake rotor becomes variable due to a knock-back. According to the brake control device disclosed in the Patent Literature 1, in which a pre-charged pressure is generated in the wheel cylinder, the above problem (difficulty in satisfying both the improvement in responsiveness of braking force and the suppression of the generation of dragging phenomenon) would be generated due to the above variations of the separation distance.

Accordingly, this invention was made in consideration with the above-mentioned situation and the objective of the invention is to provide a brake control device which can easily suppress occurrence of the dragging in non-braking operation, keeping a necessary responsiveness of braking force.

Solution to Problem(s)

The brake control device according to a first aspect of the invention applied to a hydraulic pressure braking force generating device equipped with a wheel cylinder which applies a braking force to a vehicle wheel of a vehicle, a master cylinder which outputs a master pressure to the wheel cylinder by driving a master piston by a driving hydraulic pressure which has been inputted to a driving hydraulic pressure chamber, a mechanical driving hydraulic pressure generating device which outputs the driving hydraulic pressure in response to a pilot hydraulic pressure which has been inputted to a pilot hydraulic pressure chamber and an electric pilot hydraulic pressure generating device which outputs a desired hydraulic pressure to the pilot hydraulic pressure chamber, wherein the brake control device includes a judging portion for judging whether or not an operating amount of a brake operating member is equal to or less than a predetermined value and a pilot hydraulic pressure control portion for controlling the pilot hydraulic pressure generating device to generate a preparatory hydraulic pressure in the pilot hydraulic pressure chamber which is larger than an atmospheric pressure set to a value so that a hydraulic pressure in the wheel cylinder is kept substantially to the atmospheric pressure, when the judging portion judges that the operating amount of the brake operating member is equal to or less than the predetermined value.

The brake control device according to a second aspect of the invention is characterized in that in the feature of the first aspect, a predicting portion is provided for predicting an application of the braking force to the vehicle wheel at which the wheel cylinder is provided and wherein the pilot hydraulic pressure control portion generates the preparatory hydraulic pressure which is larger than the atmospheric pressure when the application of the braking force to the vehicle wheel is predicted by the predicting portion.

The brake control device according to a third aspect of the invention is characterized in that in the feature of the above first aspect or the second aspect of the invention, the pilot hydraulic pressure control portion controls the pilot hydraulic pressure generating device to supply the pilot hydraulic pressure chamber with a predetermined amount of operating fluid corresponding to the preparatory hydraulic pressure which is larger than the atmospheric pressure.

The brake control device according to a fourth aspect of the invention is characterized in that in the feature of the first or the second aspect, a driving hydraulic pressure obtaining portion is provided for obtaining the driving hydraulic pressure, wherein the pilot hydraulic pressure control portion controls the pilot hydraulic pressure generating device so that the driving hydraulic pressure obtained by the driving hydraulic pressure obtaining portion becomes a preparatory driving hydraulic pressure corresponding to the preparatory hydraulic pressure which is larger than the atmospheric pressure.

The brake control device according to a fifth aspect of the invention is characterized in that in the feature of the first or the second aspect, a pilot hydraulic pressure obtaining portion is provided for obtaining the pilot hydraulic pressure, wherein the pilot hydraulic pressure control portion controls the pilot hydraulic pressure generating device so that the pilot hydraulic pressure obtained by the pilot hydraulic pressure obtaining portion becomes the preparatory hydraulic pressure which is larger than the atmospheric pressure.

The brake control device according to a sixth aspect of the invention is characterized in that in any one of the features of the first through fifth aspects, the preparatory pilot hydraulic pressure is set so that a hydraulic pressure generated in the driving hydraulic pressure chamber becomes equal to or less than a set load of a biasing member which biases the master piston to an initial position thereof.

The brake control device according to the first aspect of the invention generates the predetermined preparatory pilot hydraulic pressure in the pilot hydraulic pressure chamber when the operating amount of the brake operating member is equal to or less than the predetermined value. Thus, by generating in advance the preparatory hydraulic pressure in the pilot hydraulic pressure chamber before the operating amount of the brake operating member becomes larger than the predetermined value, the period of time after the operating amount of the brake operating member becomes more than the predetermined value until the braking force is applied to the vehicle wheel can be shortened.

Further, since the preparatory pilot hydraulic pressure is set to the value that the wheel hydraulic pressure can be kept to substantially the atmospheric pressure level, the generation of dragging phenomenon can be more easily suppressed, compared to the structure of the brake control device disclosed in the Patent Literature 1, in which the pre-charged pressure is generated in the wheel cylinder. In other words, the brake control device according to the first aspect can easily ensure both of the improvements in responsiveness of the braking force and the suppression of the generation of dragging phenomenon.

It is noted that the condition that the operating amount of the brake operating member is equal to or less than the predetermined value includes the case that the operating amount of the brake operating member is zero (0), which means that the brake operating member is not operated.

According to the brake control device of the second aspect of the invention, the pilot hydraulic pressure control portion generates the preparatory pilot hydraulic pressure in the pilot hydraulic pressure chamber when the predicting portion predicts that braking force is applied to the vehicle. In other words, the pilot hydraulic pressure chamber is pre-charged when the operating amount of the brake operating member is equal to or less than the predetermined value and at the same time when the predicting portion predicts that the braking force is applied to the vehicle wheel. This can effectively perform pre-charging of the pilot hydraulic pressure chamber.

According to the brake control device of the third aspect of the invention, the pilot hydraulic pressure control portion generates the preparatory hydraulic pressure in the pilot hydraulic pressure chamber by supplying the pilot hydraulic pressure chamber with the predetermined amount of operating fluid. It is noted that the necessary amount of operating fluid to generate the preparatory hydraulic pressure in the pilot hydraulic pressure chamber can be calculated in advance and accordingly, the control for supply of necessary amount of operating fluid can be pre-set in advance. Therefore no detection of wheel hydraulic pressure, driving hydraulic pressure or the pilot hydraulic pressure is needed. Therefore, it is possible to reduce manufacturing cost of the brake control device.

According to the brake control device of the fourth aspect of the invention, the pilot hydraulic pressure control portion controls the pilot hydraulic pressure generating device so that the driving hydraulic pressure obtained by the driving hydraulic pressure obtaining portion becomes a preparatory driving hydraulic pressure corresponding to the preparatory hydraulic pressure which is larger than the atmospheric pressure. Thus, the deviation of the driving hydraulic pressure relative to the pilot hydraulic pressure among the individual driving hydraulic pressure generating devices can be excluded to further easily satisfy both the improvement in responsiveness of braking force and the suppression of the generation of dragging phenomenon.

According to the brake control device of the fifth aspect of the invention, the pilot hydraulic pressure obtaining portion obtains the pilot hydraulic pressure and the pilot hydraulic pressure control portion controls the pilot hydraulic pressure generating device so that the obtained pilot hydraulic pressure becomes the preparatory hydraulic pressure which is larger than the atmospheric pressure. Thus, the preparatory pilot hydraulic pressure can be generated monitoring the pilot hydraulic pressure, to thereby accurately control the pilot hydraulic pressure. For example, the pilot hydraulic pressure can be raised to the upper limit value, where no ineffective hydraulic amount of the operating fluid can flow into the pilot hydraulic pressure chamber. This can highly improve the responsiveness of the braking force.

According to the brake control device of the sixth aspect of the invention, the preparatory driving hydraulic pressure is set to be higher than the atmospheric pressure and equal to or smaller than the set load of the biasing member for biasing the master piston. Accordingly, the preparatory driving hydraulic pressure does not move the master piston to reduce an ineffective amount of the operating fluid in the pilot hydraulic pressure chamber. The ineffective amount of operating fluid here means the hydraulic fluid amount by which the driving hydraulic pressure is not changed even being supplied into the pilot hydraulic pressure chamber. Therefore, this can surely ensure the suppression of the generation of dragging phenomenon, keeping the responsiveness of braking force.

BRIEF EXPLANATION OF ATTACHED DRAWINGS

FIG. 10 is a flowchart for explaining a pre-charge control according to the fourth embodiment of the invention.

EMBODIMENTS FOR IMPLEMENTING INVENTION

Figure 1:
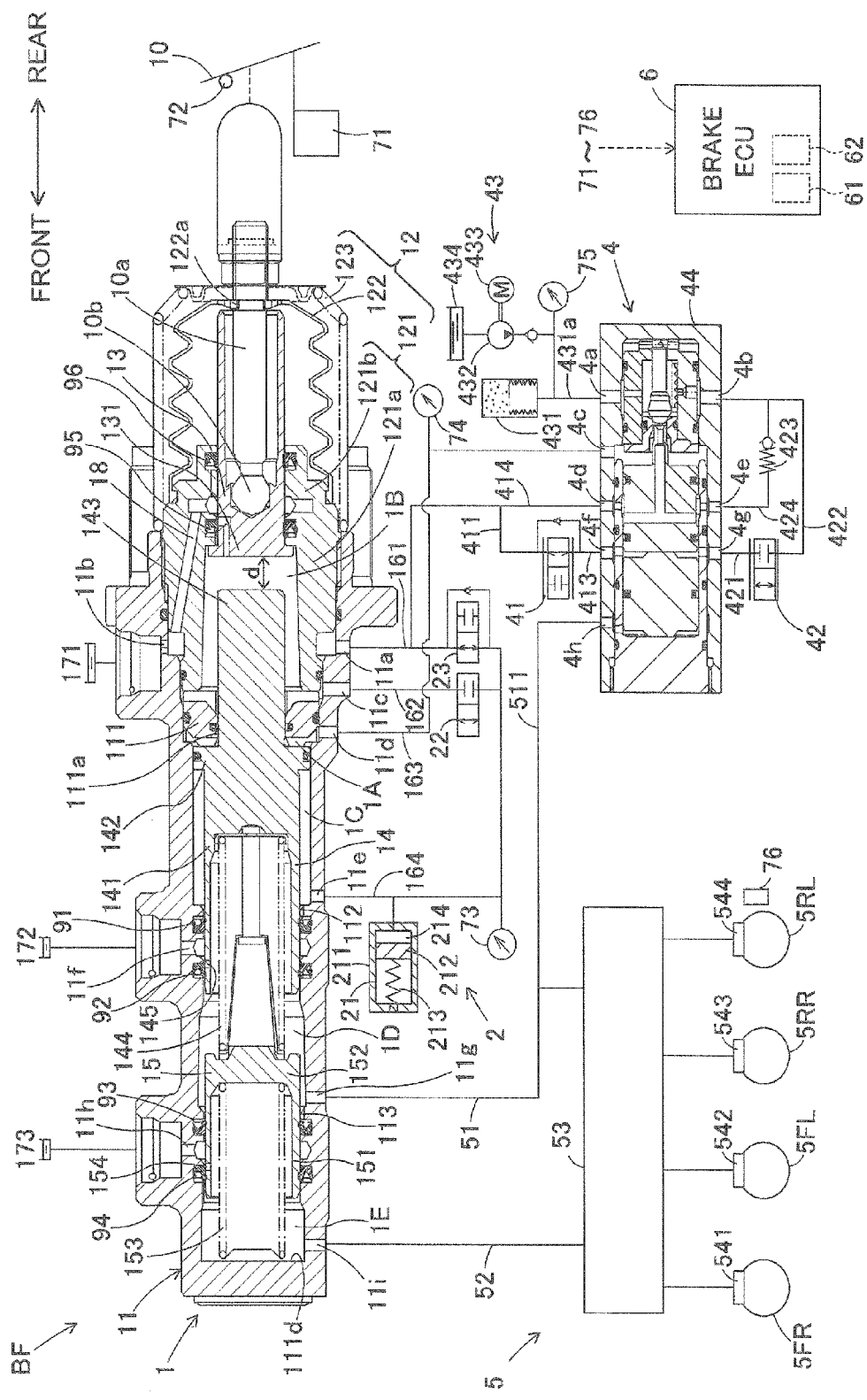
FIG. 1 is a conceptual view of the brake control device and the hydraulic pressure braking force generating device according to a first embodiment of the invention.

The brake control device and the vehicle brake device to which the brake control device according to the embodiments of the invention is applicable will be explained hereinafter with reference to the attached drawings. It is noted that the same or equivalent components or parts are referenced with the same symbols or the numerals and the shape and the size of each component in the drawings, by which the structural explanation thereof will be made, are not necessarily accurate to the actual product.

<First Embodiment>

As shown in FIG. 1, the vehicle brake device is formed by a hydraulic pressure braking force generating device BF which generates the hydraulic pressure braking force and applies the hydraulic pressure braking force to the vehicle wheels 5FR, 5FL, 5RR and 5RL and a regeneration braking force generating device (not shown) which generates the regeneration braking force at the drive wheel, for example, such as the left and right front wheels 5FR and 5FL and so on. The brake control device according to the first embodiment is formed by including a brake ECU 6 which controls the hydraulic pressure braking force generating device BF.

(Hydraulic Pressure Braking Force Generating Device BF)

The hydraulic pressure braking force generating device BF is formed by a master cylinder 1, a reaction force generating device 2, a first control valve 22, a second control valve 23, and a servo hydraulic pressure generating device 4, a hydraulic pressure control portion 5 and various sensors 71 through 76 and so on.

(Master Cylinder 1)

The master cylinder 1 is a portion which supplies the hydraulic pressure control portion 5 with the operating fluid in response to the operating amount of a brake pedal 10 (corresponding to the brake operating member) and is formed mainly by a main cylinder 11, a cover cylinder 12, an input piston 13, a first master piston 14 and a second master piston 15 and so on.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof. The main cylinder 11 is provided therein at portions closer to the front end than the inner wall portion 111 with a small diameter portion 112 (rear) and a small diameter portion 113 (front), each of which inner diameter is set to be somewhat smaller than the inner diameter of the inner wall portion 111. In other words, the small diameter portions 112, 113 project from the inner circumferential surface of the main cylinder 11 having an inwardly annularly shaped profile. The first master piston 14 is provided inside the main cylinder 11 and is slidably movable along the small diameter portion 112 in the axial direction. Similarly, the second master piston 15 is provided inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than an inner diameter of the front portion 121a.

The boots 122 is of tubular bellow shaped and is used for dust prevention purpose and is extendible or compressible in front and rearward directions. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical potion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably and fluid-tightly in contact with the through hole 111a of the inner wall portion 111. The rear end of the projection portion 143 projects into the inner space of the cylindrical portion 121 passing through the through hole 111a and is separated from the inner peripheral surface of the cylindrical portion 121. The rear end surface of the projection portion 143 is separated from the bottom wall 131 of the input piston 13 and the separation distance "d" is formed to be variable.

It is noted here that a "first pressure applying chamber 1D" is defined by the inner peripheral surface of the main cylinder 11, a front side of the pressurizing cylindrical portion 141 of the first master piston 14 and a rear side of the second master piston 15. A rear chamber which is located further rearward of the first pressure applying chamber 1D, is defined by the inner peripheral surface (inner peripheral portion) of the main cylinder 11, the small diameter portion 112, a front surface of the flange portion 142 and the outer peripheral surface of the first master piston 14. The flange portion 142 of the first master piston 14 separates the rear chamber into a front portion and a rear portion and the front portion is defined to be a "second hydraulic pressure chamber 1C" and the rear portion is defined to be a "servo chamber 1A" (corresponding to a "driving hydraulic pressure chamber"). A "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 13.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. "A second pressure applying chamber 1E" is defined by the inner peripheral surface and the inner bottom surface 111d of the main cylinder 11 and the pressurizing cylindrical portion 151 of the second master piston 15.

Ports 11a to 11i, which connect the inside and the outside of the master cylinder 1, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through an annular clearance formed between the inner circumferential surface of the main cylinder 11 and the outer circumferential surface of the cylindrical portion 121. The port 11a and the port 11b are connected to a conduit 161 and also connected to a reservoir 171.

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the inner wall portion 111 and at the same time forward of the port 11c and the port 11d connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first pressure applying chamber 1D via a passage 145 formed at the first master piston 14. The passage 145 is formed at a location where the port 11f and the first pressure applying chamber 1D are disconnected from each other when the first master piston 14 advances forward.

The port 11g is formed at a location forward of the port 11f and connects the first pressure applying chamber 1D with a conduit 51. The port 11h is formed between the sealing members 93 and 94 provided at the small diameter portion 113 and connects a reservoir 173 with the inside of the main cylinder 11. The port 11h is in communication with the second pressure applying chamber 1E via a passage 154 formed at the pressurizing cylindrical portion 151 of the second master piston 15. The passage 154 is formed at a location where the port 11h and the second pressure applying chamber 1E are disconnected from each other when the second master piston 15 advances forward. The port 11i is formed at a location forward of the port 11h and connects the second pressure applying chamber 1E with a conduit 52.

A sealing member, such as an O-ring and the like (see black dot in the drawings) is appropriately provided within the master cylinder 1. The sealing members 91 and 92 are provided at the small diameter portion 112 and in liquid-tightly contact with the outer circumferential surface of the first master piston 14. Similarly, the sealing members 93, 94 are provided at the small diameter portion 113 and in liquid-tightly contact with the outer circumferential surface of the second master piston 15. Additionally, sealing members 95 and 96 are provided between the input piston 13 and the cylindrical portion 121.

The stroke sensor 71 is a sensor which detects the operating amount (stroke amount) of the operation of the brake pedal 10 by a driver of the vehicle and transmits the detected result to the brake ECU 6. A brake stop switch 72 is a switch which detects whether the brake pedal 10 is depressed or not, using a binary signal and a detected signal is sent to the brake ECU 6.

(Reaction Force Generating Device 2)

The reaction force generating device 2 is a device which generates a reaction force against the operation force when the brake pedal 10 is depressed and is formed by mainly a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein and a reaction force hydraulic pressure chamber 214 is formed at a location frontward of the piston 212. The piston 212 is biased in the frontward direction by a compression spring 213. The reaction force hydraulic pressure chamber 214 is connected to the second hydraulic pressure chamber 1C via a conduit 164 and the port 11e, and is connected further to the first control valve 22 and the second control valve 23 via the conduit 164.

(First Control Valve 22)

The first control valve 22 is an electromagnetic valve which is structured to close under non-energized state and opening and closing thereof is controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 1C.

The first control valve 22 is closed under non-energized state and under this state communication between the first hydraulic pressure chamber 1B and the second hydraulic pressure chamber 1C is interrupted. Due to the closure of the first hydraulic pressure chamber 1B, the operating fluid is nowhere to flow and the input piston 13 and the first master piston 14 are moved integrally keeping the separation distance "d" therebetween to be constant. The first control valve 22 is open under the energized state and under such state, the communication between the first hydraulic pressure chamber 1B and the second hydraulic pressure chamber 1C is established. Thus, the volume change in the first hydraulic pressure chamber 1B and the second hydraulic pressure chamber 1C due to the movement of the first master piston 14 can be absorbed by the transferring of the operating fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state. On the other hand, while the first control valve 22 is in an open state, the pressure sensor 73 also detects the pressure (or the reaction force hydraulic pressure) in the hydraulically connected first hydraulic pressure chamber 1B. The pressure sensor 73 sends the detected signal to the brake ECU 6.

(Second Control Valve 23)

The second control valve 23 is an electromagnetic valve which is structured to open under a non-energized state and the opening and closing thereof is controlled by the brake ECU 6. The second control valve 23 is disposed between the conduit 164 and the conduit 161 for establishing communication therebetween. The conduit 164 is in communication with the second hydraulic pressure chamber 1C via the port 11e and the conduit 161 is in communication with the reservoir 171 via the port 11a. Accordingly, the second control valve 23 establishes communication between the second hydraulic pressure chamber 1C and the reservoir 171 under the non-energized state not to generate any reaction force hydraulic pressure but interrupts the communication therebetween to generate the reaction force hydraulic pressure under the energized state.

(Servo Hydraulic Pressure Generating Device 4)

The servo hydraulic pressure generating device 4 is formed by a pressure decreasing valve 41, a pressure increasing valve 42, a high pressure supplying portion 43 and a regulator 44 and so on. The pressure decreasing valve 41 is a valve structured to open under a non-energized state and the flow-rate thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 via the conduits 411, 161 and ports 11a and 11b. The pressure increasing valve 42 is a valve structured to close under a non-energized state and the flow-rate thereof is controlled by the brake ECU 6. One end of the pressure increasing valve 42 is connected to the conduit 421 and the other end thereof is connected to the conduit 422. Both pressure decreasing and increasing valves 41 and 42 correspond to a pilot hydraulic pressure generating device.

The high pressure supplying portion 43 is a portion for supplying the regulator 44 with a highly pressurized operating fluid. The high pressure supplying portion 43 includes an accumulator (high pressure source) 431, a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the pressurized operating fluid to the accumulator 431, the operating fluid being accumulated in the reservoir 434. The pressure sensor 75 provided in the conduit 431a detects the accumulator hydraulic pressure in the accumulator 431 and the detected signal is sent to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 supplies the pressurized operating fluid to the accumulator 431 in order to recover a pressure up to the value equal to or more than the predetermined value.

Figure 2:
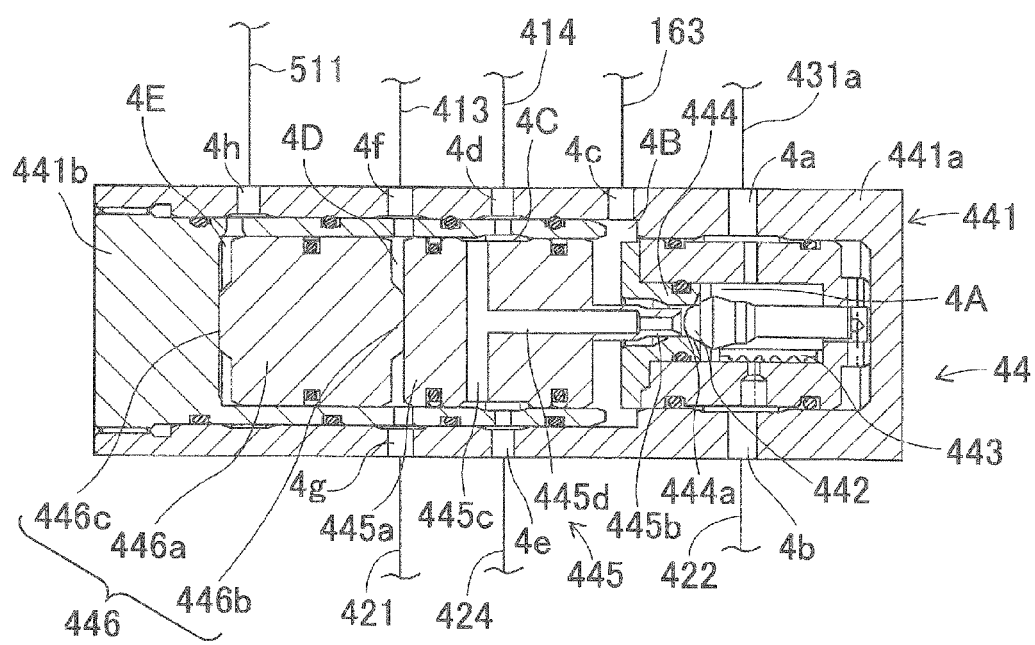
FIG. 2 is a cross sectional view of a servo hydraulic pressure generating device showing a detail structure thereof according to the first embodiment.

FIG. 2 is a partial cross sectional view illustrating a configuration of the inside of the mechanical regulator 44 which forms the servo hydraulic pressure generating device 4. As shown in the drawing, the regulator 44 (corresponding to the driving hydraulic pressure generating device) includes a cylinder 441, a ball valve 442, a biasing portion 443, a valve seat portion 444, a control piston 445 and a sub-piston 446 and so forth.

The cylinder 441 includes a cylinder case 441*a* formed in a substantially bottomed cylinder-shape having a bottom surface at one end thereof (at the right side in FIG. 2) and a cover member 441*b* closing an opening of the cylinder case 441*a* (at the left side thereof in FIG. 2). It is noted here that the cover member 441*b* is formed to be a C-shape in cross section in the drawing, but in this embodiment, the shape of the cover member 441*b* is of columnar shape and a portion which closes the opening of the cylinder case 441*a* is explained as the cover member 441*b*. The cylinder case 441*a* is provided with a plurality of ports 4*a* through 4*h* through which the inside and the outside of the cylinder case 441*a* are in communication.

The port 4*a* is connected to the conduit 431*a*. The port 4*b* is connected to the conduit 422. The port 4*c* is connected to a conduit 163. The conduit 163 connects the servo chamber 1A and the outlet port 4*c*. The port 4*d* is connected to the conduit 161 via the conduit 414. The port 4*e* is connected to the conduit 424 and further connected to the conduit 422 via a relief valve 423. The port 4*f* is connected to the conduit 413. The port 4*g* is connected to the conduit 421. The port 4*h* is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441*a* inside of the cylinder 441. The biasing portion 443 is formed by a spring member biasing the ball valve 442 towards the opening side (which will be hereinafter referred to also as a cylinder opening side) of the cylinder case 441*a*, and is provided at the bottom surface of the cylinder case 441*a*. The valve seat portion 444 is a wall member provided at the inner peripheral surface of the cylinder case 441*a* and divides the cylinder into the cylinder opening side and the cylinder bottom surface side. A through passage 444*a* through which the divided cylinder opening side and the cylinder bottom surface side are in communication is formed at a center of the valve seat portion 444. The valve seat portion 444 supports the ball valve 442 from the cylinder opening side in a manner that the biased ball valve 442 closes the through passage 444*a*.

A space defined by the ball valve 442, the biasing portion 443, the valve seat portion 444 and the inner circumferential surface of the cylinder case 441*a* at the cylinder bottom surface side is referred to as a "first chamber 4A". The first chamber 4A is filled with the operating fluid and is connected to the conduit 431*a* via the port 4*a* and to the conduit 422 via the port 4*b*.

The control piston 445 includes a main body portion 445*a* formed in a substantially columnar shape and a projection portion 445*b* formed in a substantially columnar shape having a smaller diameter than the main body portion 445*a*. The main body portion 445*a* is arranged in the cylinder 441 in a coaxial and liquid-tight manner on the cylinder opening side of the valve seat portion 444, the main body portion 445*a* being slidably movable in the axial direction. The main body portion 445*a* is biased towards the cylinder opening side by means of a biasing member (not shown). A passage 445*c* is formed at a substantially intermediate portion of the main body portion 445*a* in a cylinder axis direction. The passage 445*c* extends in the radial direction (in an up-and-down direction as viewed in FIG. 2) and both end portions thereof open at a circumferential surface of the main body portion 445*a*. A portion of an inner circumferential surface of the cylinder 441 corresponding to an opening position of the passage 445*c* is provided with the port 4*d* and is formed to be recessed, which recessed space portion forms a "third chamber 4C".

The projection portion 445*b* projects towards the cylinder bottom surface side from a center portion of an end surface of the cylinder bottom surface side of the main body portion 445*a*. The projection portion 445*b* is formed so that the diameter thereof is smaller than the diameter of the through passage 444*a* of the valve seat portion 444. The projection portion 445*b* is coaxially provided relative to the through passage 444*a*. A tip end of the projection portion 445*b* is spaced apart from the ball valve 442 towards the cylinder opening side by a predetermined distance. A passage 445*d* is formed at the projection portion 445*b* so that the passage 445*d* extends in the cylinder axis direction and opens at a center portion of an end surface of the projection portion 445*b*. The passage 445*d* extends up to the inside of the main body portion 445*a* and is connected to the passage 445*c*.

A space defined by the end surface of the cylinder bottom surface side of the main body portion 445*a*, an outer surface of the projection portion 445*b*, the inner circumferential surface of the cylinder 441, the valve seat portion 444 and the ball valve 442 is referred to as a "second chamber 4B". The second chamber 4B is in communication with the ports 4*d* and 4*e* via the passages 445*d* and 445*c* and the third chamber 4C.

The sub-piston 446 includes a sub main body portion 446*a*, a first projection portion 446*b* and a second projection portion 446*c*. The sub main body portion 446*a* is formed in a substantially columnar shape. The sub main body portion 446*a* is arranged within the cylinder 441 in a coaxial and liquid-tight manner on the cylinder opening side of the main body portion 445*a* the sub main body portion 446*a* being slidably movable in the axial direction.

The first projection portion 446*b* is formed in a substantially columnar shape having a smaller diameter than the sub main body portion 446*a* and projects from a center portion of an end surface of the cylinder bottom surface side of the sub main body portion 446*a*. The first projection portion 446*b* is in contact with the end surface of the cylinder bottom surface side of the sub main body portion 446*a*. The second projection portion 446*c* is formed in the same shape as the first projection portion 446*b*. The second projection portion 446*c* projects from a center portion of an end surface of the cylinder opening side of the sub main body portion 446*a*. The second projection portion 446*c* is in contact with the cover member 441*b*.

A space defined by the end surface of the cylinder bottom surface side of the sub main body portion 446*a*, an outer peripheral surface of the first projection portion 446*b*, an end surface of the cylinder opening side of the control piston 445 and the inner circumferential surface of the cylinder 441 is referred to as a "first pilot hydraulic pressure chamber 4D". The first pilot hydraulic pressure chamber 4D is in communication with the pressure decreasing valve 41 via the port 4f and the conduit 413 and is in communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "fourth chamber 4E". The fourth chamber 4E is in communication with the port 11g via the port 4h and the conduits 511 and 51. Each of the chambers 4A through 4E is filled with the operating fluid. The pressure sensor 74 is a sensor that detects the servo hydraulic pressure (driving hydraulic pressure) to be supplied to the servo chamber 1A and is connected to the conduit 163 as shown in FIG. 1. The pressure sensor 74 sends the detected signal to the brake ECU 6. The servo hydraulic pressure generating device corresponding to the driving hydraulic pressure generating device is thus formed.

(Hydraulic Pressure Control Portion 5)

The first and the second pressure applying chambers 1D and 1E which generate the master cylinder hydraulic pressure (master hydraulic pressure) are connected to the wheel cylinders 541 through 544 via the conduits 51 and 52 and ABS 53 (Anti-lock Brake System). The wheel cylinders 541 through 544 form a brake device for the vehicle wheels 5FR through 5RL. In more specifically, the port 11g of the first pressure applying chamber 1D and the port 11i of the second pressure applying chamber 1E are connected to the well-known ABS 53 via the conduits 51 and 52, respectively. The ABS 53 is connected to the wheel cylinders 541 through 544 which operate the brake device to perform braking operation at the wheels 5FR through 5RL.

(Brake ECU 6)

The brake ECU 6 is an electronic control unit and includes a microprocessor. The microprocessor includes an input/output interface, CPU, RAM, ROM and a memory portion such as non-volatile memory, connected with one another through bus communication.

The brake ECU 6 is connected to the various sensors 71 through 76 for controlling the electromagnetic valves 22, 23, 41 and 42 and the motor 433 and so on. The operating amount (stroke amount) of brake pedal 10 operated by the operator of the vehicle is inputted to the brake ECU 6 from the stroke sensor 71, whether or not the operation of the brake pedal 10 by the operator of the vehicle is performed is inputted to the brake ECU 6 from the brake stop switch 72, the reaction force hydraulic pressure of the second hydraulic pressure chamber 1C or the pressure of the first hydraulic pressure chamber 1B is inputted to the brake ECU 6 from the pressure sensor 73, the servo hydraulic pressure (driving hydraulic pressure) supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR through 5RL is inputted to the brake ECU 6 from each of the vehicle wheel speed sensors 76.

The brake control by the brake ECU 6 will be explained hereinafter except the pre-charge control which will be explained later. The brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first and the second hydraulic pressure chambers 1B and 1C is established.

Under the state that the brake pedal 10 is not depressed (i.e., operating amount is zero), the ball valve 442 of the servo hydraulic pressure generating device 4 closes the through passage 444a of the valve seat 444. Under this state, the pressure decreasing valve 41 is in an open state and the pressure increasing valve 42 is in a closed state and the communication between the first chamber 4A and the second chamber 4B is interrupted. The second chamber 4B is in communication with the servo chamber 1A via the conduit 163 to keep the hydraulic pressures in the two chambers 4B and 1A being mutually in an equal level. The second chamber 4B is in communication with the third chamber 4C via the passages 445c and 445d of the control piston 445 and is further in communication with the reservoir 171 via the conduits 414 and 161. One side of the pilot hydraulic pressure chamber 4D is closed by the pressure increasing valve 42, while the other side thereof is connected to the reservoir 171 and the second chamber 4B through the pressure decreasing valve 41. The fourth chamber 4E is in communication with the first pressure applying chamber 1D via the conduits 511 and 51 thereby keeping the pressure level of the two chambers 4E and 1D mutually to be equal to each other. Accordingly, as is obvious from the above structure, the servo hydraulic pressure is not generated in the servo chamber 1A, nor is generated the master hydraulic pressure in the first pressure applying chamber 1D.

From this state, when the brake pedal 10 is depressed, the input piston 13 advances and the passage 18 is interrupted to thereby interrupt the communication between the reservoir 171 and the first hydraulic pressure chamber 1B. The same amount of operating fluid as the amount of operating fluid flowing from the first hydraulic pressure chamber 1B via the projection portion 143 is flowing into or out of the second hydraulic pressure chamber 1C in response to the displacement of the first master piston 14. The stroke simulator 21 generates the reaction force pressure corresponding to the stroke amount of the input piston 13 (operating amount of the brake pedal 10) in the first and the second hydraulic pressure chambers 1B and 1C. In other words, the stroke simulator 21 applies the reaction force pressure against the brake pedal 10 which is connected to the input piston 13 in response to the stroke amount of the input piston 13 (operating amount of the brake pedal 10).

It is noted here that the area of a tip end surface of the projecting portion 143 and the area of a surface of the flange portion 142 facing the second hydraulic pressure chamber 1C are formed to be the same. Therefore, when the second control valve 23 is in a closed state and the first control valve 22 is in an open state, the internal pressure of the first hydraulic pressure chamber 1B and the internal pressure of the second hydraulic pressure chamber 1C are the same and accordingly, the force that the reaction force pressure in the first hydraulic pressure chamber 1B acting on the tip end surface of the projecting portion 143 and the force that the reaction force pressure in the second hydraulic pressure chamber 1C acting on the surface of the flange portion 142 facing the second hydraulic pressure chamber 1C become equal. Accordingly, even the operator of the vehicle depresses the brake pedal 10 to have the internal pressures of both first and second chambers 1B and 1C to be raised, the first master piston 14 does not move. Further, since the area of the tip end surface of the projecting portion 143 and the area of the surface of the flange portion 142 facing the second hydraulic pressure chamber 1C are formed to be the same, even if the first master piston 14 should move, the brake fluid amount flowing into the stroke simulator 21 is not changed and accordingly, the reaction force transmitted to the brake pedal 10 is not changed. The brake ECU 6 controls the hydraulic pressure braking force generating device BF to apply a target braking force to the wheels 5FR, 5FL, 5RR and 5RL.

Explaining the servo hydraulic pressure generating device 4, fluid communication is established between the accumulator 431 and the pilot hydraulic pressure chamber 4D when the pressure increasing valve 42 is open and the fluid communication between the pilot hydraulic pressure chamber 4D and the reservoir 171 is interrupted when the pressure decreasing valve 41 is closed. The hydraulic pressure in the pilot hydraulic pressure chamber 4D can be raised by the high pressure operating fluid supplied from the accumulator 431. By the raising of the hydraulic pressure in the pilot hydraulic pressure chamber 4D, the control piston 445 slidably moves towards the cylinder bottom surface side. Then the tip end of the projecting portion 445 of the control piston 445 is brought into contact with the ball valve 442 to close the passage 445d by the ball valve 442. Thus the fluid communication between the second chamber 4B and the reservoir 171 is interrupted.

By further slidable movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized operating fluid is supplied to the first chamber 4A from the accumulator 431, the hydraulic pressure in the second chamber 4B is also increased by the communication therebetween.

As the pressure increase of the second chamber 4B, the servo hydraulic pressure in the servo chamber 1A which is in fluid communication with the second chamber 4B increases. By the pressure increase of the servo hydraulic pressure, the first master piston 14 advances forward and the master cylinder hydraulic pressure in the first pressure applying chamber 1D increases. Then the second master piston 15 advances forward too and the master cylinder pressure in the second pressure applying chamber 1E increases. By the increase of the master cylinder hydraulic pressure, high pressure operating fluid is supplied to the wheel cylinders 541 through 544 via the conduits 51 and 52 and the hydraulic pressure control portion 5. Thus the hydraulic pressure braking force is applied to the vehicle wheels 5FR through 5RL.

The master cylinder hydraulic pressure in the first pressure applying chamber 1D is fed back to the fourth chamber 4E of the servo hydraulic pressure generating device 4. The pressure in the fourth chamber 4E increases to become equal to the hydraulic pressure in the pilot hydraulic pressure chamber 4D. Therefore, the sub piston 446 does not move. Thus, based on the servo hydraulic pressure generated from the high pressurized fluid of the accumulator 431, the hydraulic pressure braking force supplementing shortage of the braking force.

If the generation of the hydraulic pressure braking force is required to be terminated, conversely, the pressure decreasing valve 41 is opened and the pressure increasing valve 42 is closed to establish fluid communication between the reservoir 171 and the pilot hydraulic pressure chamber 4D. Thus, the control piston 445 retreats and the servo hydraulic pressure generating device 4 returns to the state before the brake pedal 10 being depressed. The brake ECU 6 controls the pressure increasing valve 42 and the pressure decreasing valve 41 in response to the brake pedal 10 depression operation to generate the pilot hydraulic pressure in the pilot hydraulic pressure chamber 4D. When the pilot hydraulic pressure increases to a certain level by the controlling of the pressure increasing valve 42 and the pressure decreasing valve 41, the ball valve 442 is brought into contact with the projection portion 445b and by further increasing of the pilot hydraulic pressure, the ball valve 442 is separated from the valve seat portion 444 to be able to generate hydraulic pressure in the servo chamber 1A.

(Pre-Charge Control)

Figure 3:
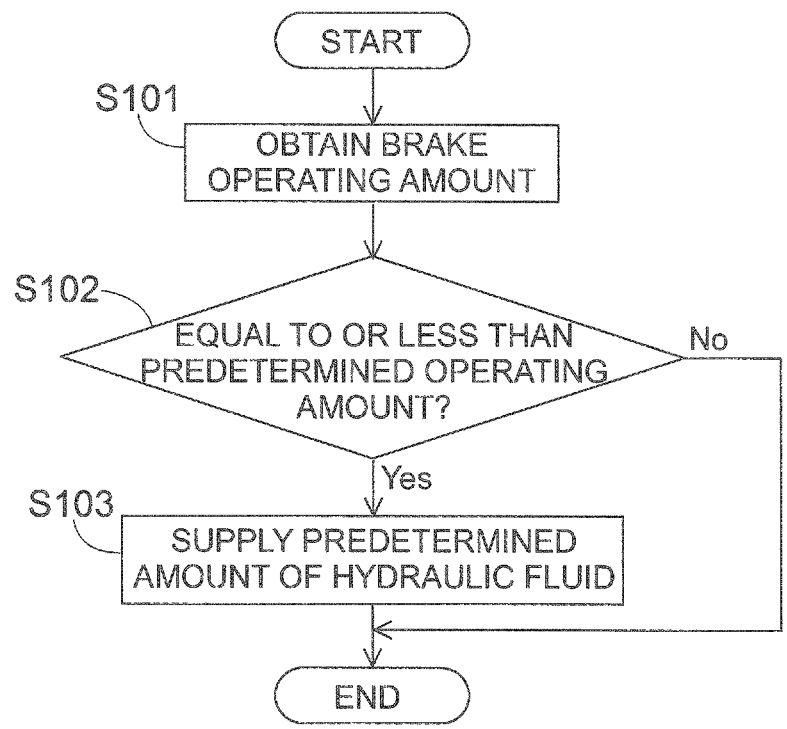
FIG. 3 is a flowchart for explaining a pre-charge control according to the first embodiment of the invention.

The pre-charge control by the brake ECU 6 according to this embodiment will be explained hereinafter. As shown in FIG. 3, the brake ECU 6 obtains the information on the operating amount of the brake pedal 10 from the stroke sensor 71 and obtains signal from the brake switch 72 (S101). The brake ECU 6 judges whether or not the obtained operating amount (and information whether operation is made or not) is equal to or less than a predetermined value (S102). The judgment that "the obtained operating amount is equal to or less than the predetermined value" is made by the brake ECU 6 when no operation is detected by the brake switch 72 (i.e., the driver's foot is not in contact with the brake pedal 10), or when the operation is detected by the brake switch 72 and the operating amount obtained from the stroke sensor 71 is equal to or less than the predetermined value (i.e., the driver's foot is on the brake pedal 10 and the operating amount is between zero and the predetermined value: "0≤operating amount≤predetermined value").

When the brake ECU 6 judges that the operating amount is equal to or less than the predetermined operating amount value (S102: YES), the brake ECU 6 controls the pressure increasing valve 42 and the pressure decreasing valve 41 to supply the pilot hydraulic pressure chamber 4D with a predetermined hydraulic fluid amount of the operating fluid (S103). The predetermined hydraulic fluid amount is defined by the fluid amount by which the projecting portion 445 moves to a position immediately before the projection portion 445 is brought into contact with the ball valve 442 by the fluid amount of the operating fluid being supplied to the pilot hydraulic pressure chamber 4D or the fluid amount by which the projecting portion 445 moves to a position where the projection portion 445 is brought into contact with the ball valve 442, but not moving the ball valve 442.

Figure 4:
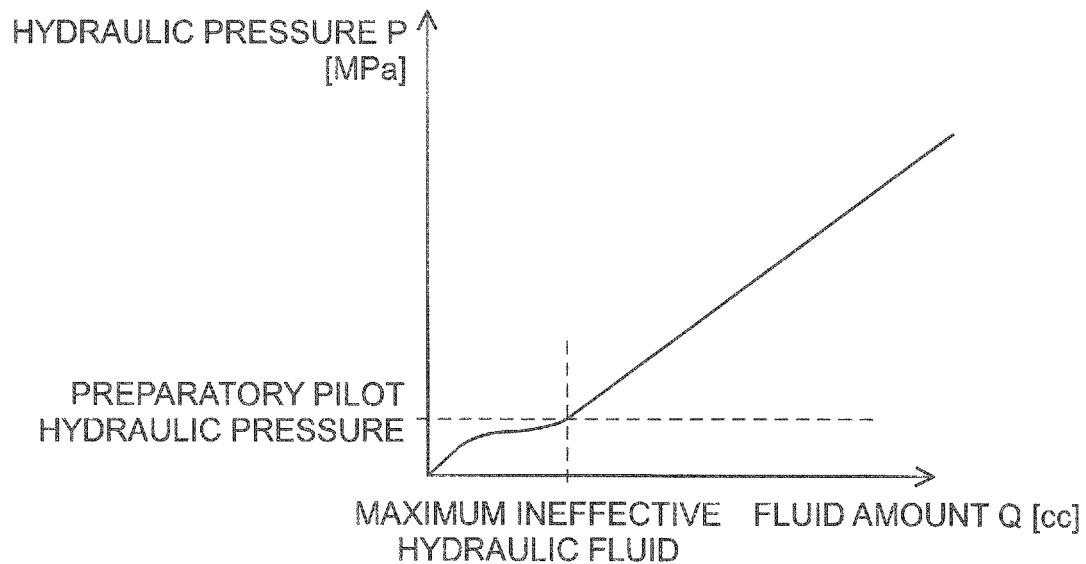
FIG. 4 is a graph showing the Q-P performance characteristics of the pilot hydraulic pressure chamber according to the first embodiment of the invention.

Such predetermined hydraulic fluid amount can be calculated in advance from the QP performance characteristics of the pilot hydraulic pressure chamber 4D as shown in FIG. 4, for example. If the maximum hydraulic fluid amount that does not change the servo hydraulic pressure even the hydraulic fluid amount of the operating fluid supplied in the pilot hydraulic pressure chamber 4D increases is defined to be the maximum ineffective hydraulic fluid amount, then the predetermined hydraulic fluid amount is set to be equal to or less than the maximum ineffective hydraulic fluid amount. Thus, the hydraulic fluid amount which is necessary to have the pilot hydraulic pressure to be the preparatory pilot hydraulic pressure which is the target hydraulic pressure of the pre-charge control can be calculated based on the QP performance characteristics of the pilot hydraulic pressure chamber. The preparatory pilot hydraulic pressure is set to a value by which the hydraulic pressure in the wheel cylinders 541 through 544 can be kept substantially to the atmospheric pressure.

Figure 5:
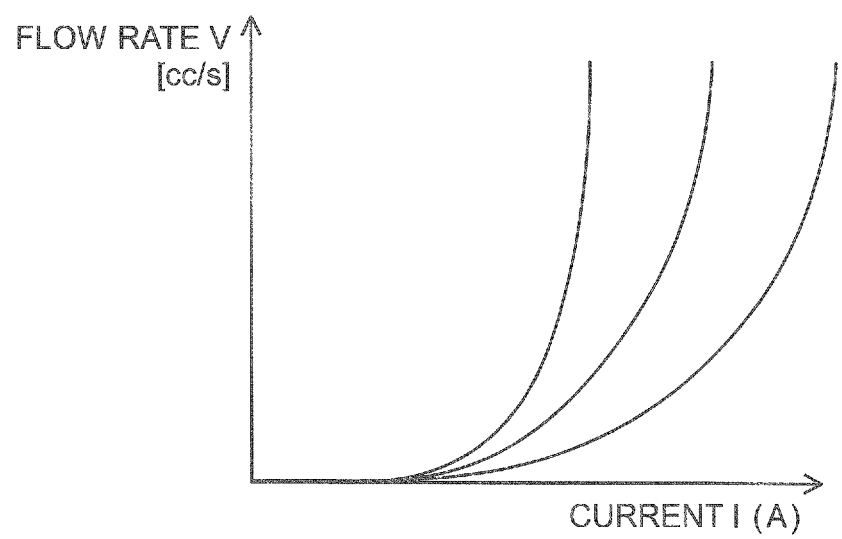
FIG. 5 is a graph showing the I-V performance characteristics of the pressure increasing valve according to the first embodiment of the invention.

The control for supplying the pilot hydraulic pressure chamber 4D with the predetermined hydraulic fluid amount is set in the brake ECU 6 in advance based on the flow-rate characteristics (IV performance characteristics) of the pressure increasing valve 42 as shown in FIG. 5 for example. In other words, the supply current value and the supply current time for the pressure increasing valve 42 which are necessary for supplying the predetermined fluid amount to the pilot hydraulic pressure chamber 4D can be calculated in advance by feed-forward way. The brake ECU 6 closes the pressure decreasing valve 41 and supplies the pressure increasing valve 42 with the predetermined current for the predetermined time period to thereby supply the pilot hydraulic pressure chamber 4D with the predetermined hydraulic fluid amount. By this operation the preparatory pilot hydraulic pressure is generated in the pilot hydraulic pressure chamber 4D and the projecting portion 445b moves to the position to be in contact with the ball valve 442 or to the position immediately before the contact with the ball valve 442.

Thus, the brake ECU 6 includes a judging portion 61 which judges whether or not the brake operating amount is equal to or less than the predetermined operating amount and a pilot hydraulic pressure control portion 62 which controls the pressure increasing valve 42 and the pressure decreasing valve 41 to generate the preparatory pilot hydraulic pressure. If the obtained operating amount is larger than the predetermined operating amount (S102: NO), the pre-charge control is not executed.

According to the brake control device of the first embodiment, when operating amount of the brake operation by the operator of the vehicle is equal to or less than the predetermined value, i.e., when the brake operating amount is zero or a small amount, the preparatory pilot hydraulic pressure has been generated in the pilot hydraulic pressure chamber 4D in advance to move the projecting portion 445 so as to be close to or to be in contact with the ball valve 442. Thus, the time to have the projecting portion 445b to be brought into contact with the ball valve 442 (time due to the ineffective hydraulic fluid amount) can be shortened or even can be decreased to zero, i.e., the responsiveness of braking force can be improved.

Further, since the ball valve 442 and the valve seat portion 444 are not separated when the above pre-charge control is performed and no servo hydraulic pressure change occurs. Therefore the master pistons 14 and 15 do not advance, i.e., the pre-charge control under this embodiment does not change the master hydraulic pressure and does not change the wheel hydraulic pressure. Accordingly, a dragging phenomenon in which for example the brake pad may contact with the brake rotor can be prevented or suppressed.

Since the deviation in the ineffective hydraulic fluid amount in the regulator 44 is smaller than the deviation in the ineffective hydraulic fluid amount of the brake caliper that pushes the brake pad onto the brake rotor, the control method by controlling the amount of the supplied hydraulic fluid according to the first embodiment can ensure the high precision and the high robustness. Further, even the servo hydraulic pressure is changed a little due to the control deviation or the like, there is no way to consider that the servo hydraulic pressure would be increased enough to move the first master piston 14 forward. In other words, even some deviation occurs in the pilot hydraulic pressure, the servo hydraulic pressure and the master hydraulic pressure serve as a buffer not to occur the increase of the wheel hydraulic pressure. In other words, the preparatory pilot hydraulic pressure is set to a value so that the servo hydraulic pressure is equal to or more than the atmospheric pressure and yet equal to or less than the set load of the biasing member 144 which biases the first master piston 14 toward the initial position thereof. Further, according to the first embodiment, a predetermined operating fluid amount is supplied to the pilot hydraulic pressure chamber 4D to generate the preparatory pilot hydraulic pressure. This structure facilitates the controlling. Further, since the regulator 44 generally allows a large amount of brake fluid to flow therethrough, even if the preparatory pilot hydraulic pressure is set to the value that the wheel hydraulic pressure is kept to be substantially the atmospheric pressure level, the responsiveness of braking force generation relative to the braking operation can be ensured.

(Second Embodiment)

The brake control device according to the second embodiment is different in structure compared to the structure of the first embodiment in the pre-charge control by the brake ECU 6. Accordingly, the pre-charge control of the second embodiment will be explained as follows.

Figure 6:
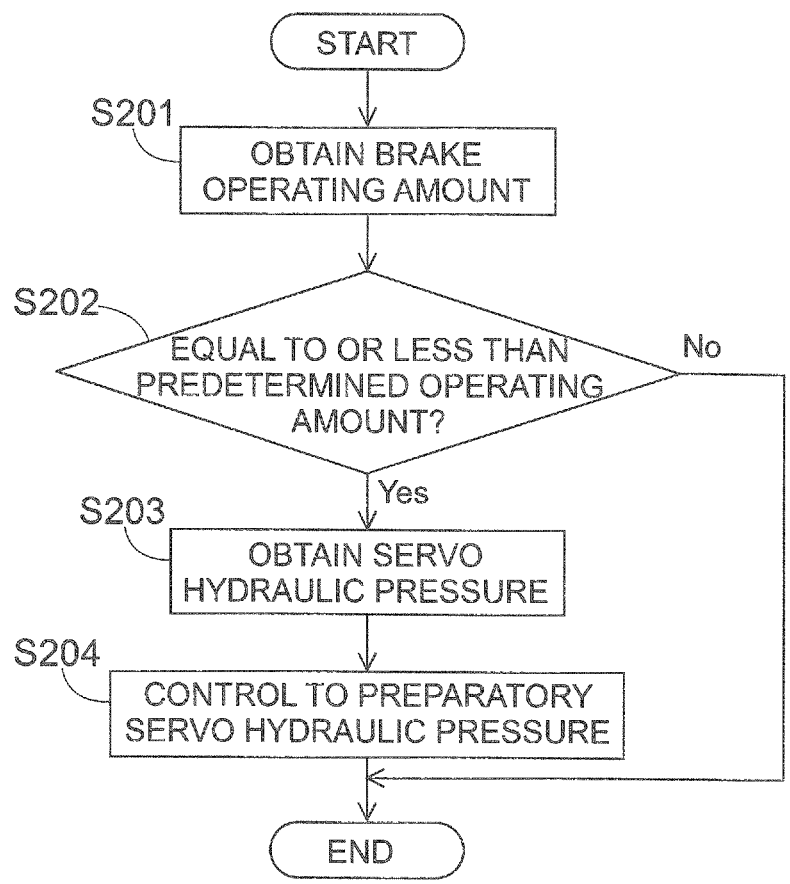
FIG. 6 is a flowchart for explaining a pre-charge control according to a second embodiment of the invention.

As shown in FIG. 6, the brake ECU 6 obtains the information on the operating amount of the brake pedal 10 from the stroke sensor 71 and obtains the signal from the brake switch 72 (S201). The brake ECU 6 judges whether the obtained operating amount (and information on whether the operation is performed or not) is equal to or less than the predetermined operating amount set in advance (S202). When the brake ECU 6 judges that the operating amount is "equal to or less than the predetermined operating amount" (S202: YES), the brake ECU 6 obtains the pressure value from the pressure sensor 74 (S203). In other words, the brake ECU 6 obtains the pressure (servo pressure) of the servo chamber 1A (S203).

Then the brake ECU 6 controls the pressure increasing valve 42 and the pressure decreasing valve 41 so that the servo hydraulic pressure becomes the predetermined preparatory servo hydraulic pressure (corresponding to the preparatory driving hydraulic pressure) (S204). The preparatory servo hydraulic pressure is the hydraulic pressure which is larger than the atmospheric pressure and at the same time is set to the value equal to or less than the set load of the biasing member 144 which biases the first master piston 14 towards the initial position. Accordingly, the preparatory pilot hydraulic pressure is the hydraulic pressure necessary for generating the preparatory servo hydraulic pressure in the servo chamber 1A. In other words, the preparatory pilot hydraulic pressure is equal to or more than the hydraulic pressure which separates the ball valve 442 from the valve seat portion 444. Thus, the brake ECU 6 controls the pressure increasing valve 42 and the pressure decreasing valve 41 to raise the pilot hydraulic pressure up to the preparatory pilot hydraulic pressure and separates the ball valve 442 from the valve seat portion 444 to raise the servo hydraulic pressure up to the preparatory servo hydraulic pressure (S204). It is noted that if the obtained operating amount is larger than the predetermined operating amount (S202: NO), the pre-charge control is not performed.

According to the second embodiment, upon brake operation, the time that the projecting portion 445b is brought into contact with the ball valve 442 (time due to the ineffective hydraulic fluid amount) can be eliminated. Further, since the servo hydraulic pressure can be increased in advance up to the preparatory servo hydraulic pressure that cannot move the first master piston 14, the time until the servo hydraulic pressure exceeds the set load and starts movement of the first master piston 14 can be shortened or can be eliminated. By this, the responsiveness of the braking force can be more improved than that of the first embodiment. Since the brake ECU 6 can control the pilot hydraulic pressure by obtaining the servo hydraulic pressure by the pressure sensor 74, the preparatory pilot hydraulic pressure can be generated with a high accuracy.

According to the second embodiment, as similar to the first embodiment, the first master piston 14 does not move by the preparatory pilot hydraulic pressure and accordingly, the master hydraulic pressure and the wheel hydraulic pressure are not raised. Thus the generation of dragging of the brake can be suppressed.

<Third Embodiment>

The brake control device according to the third embodiment is different in structure compared to the structure of the first embodiment that a pressure sensor 77 is added and the pre-charge control by the brake ECU 6 is executed based on the value from the pressure sensor 77. Accordingly, such different points will be explained. The numerals or the symbols used in the first embodiment are used here to illustrate the structures similar to those of the first embodiment and the precedent explanation shall be referred to.

Figure 7:
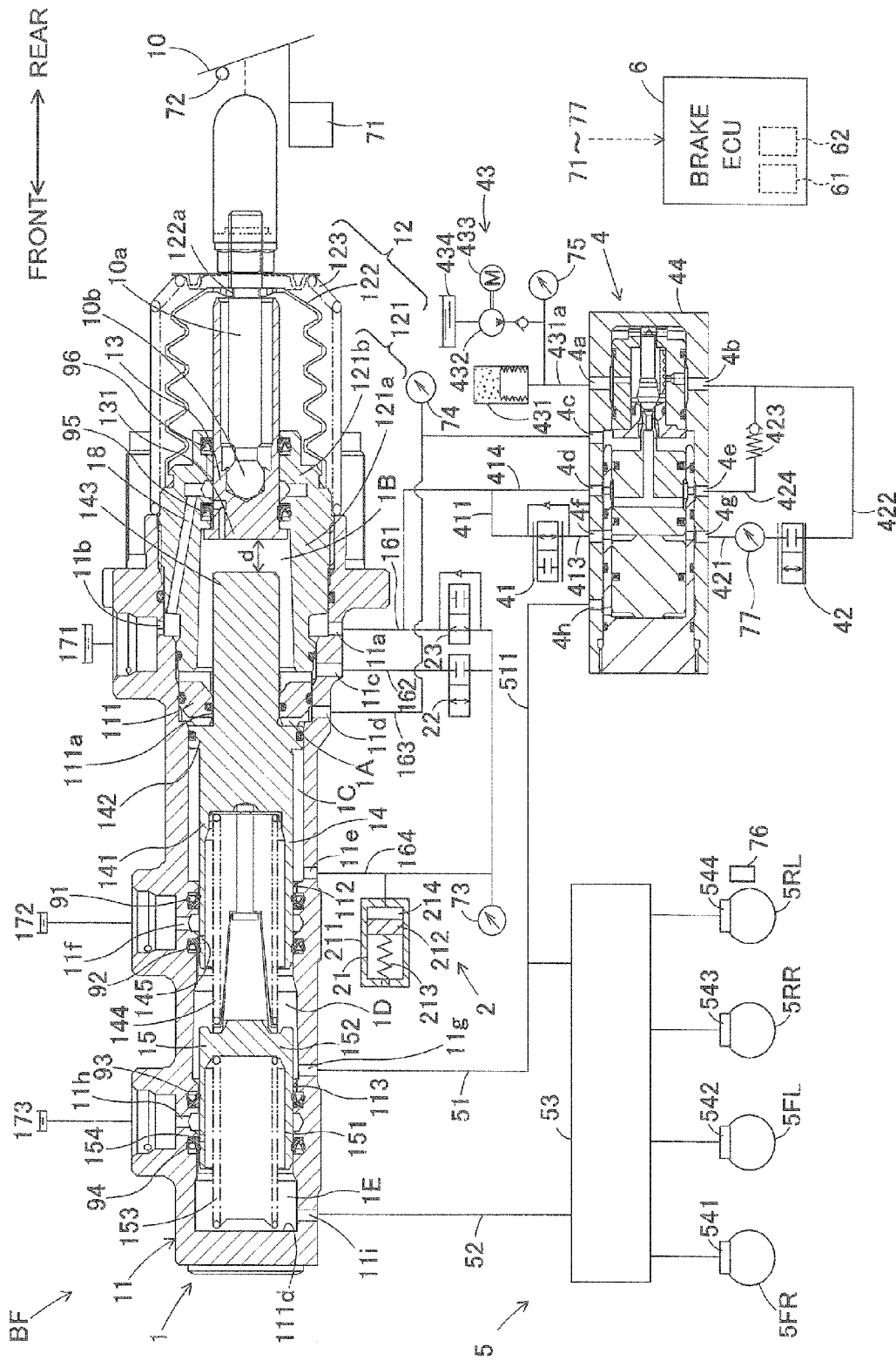
FIG. 7 is a conceptual view of the brake control device and the hydraulic pressure braking force generating device according to a third embodiment of the invention.

As shown in FIG. 7, the pressure sensor 77 is a sensor which measures the hydraulic pressure in the pilot hydraulic pressure chamber 4D and is provided in the conduit 421 positioned between the pressure increasing valve 42 and the port 4g. The brake ECU 6 obtains the information on the pilot hydraulic pressure from the pressure sensor 77.

Figure 8:
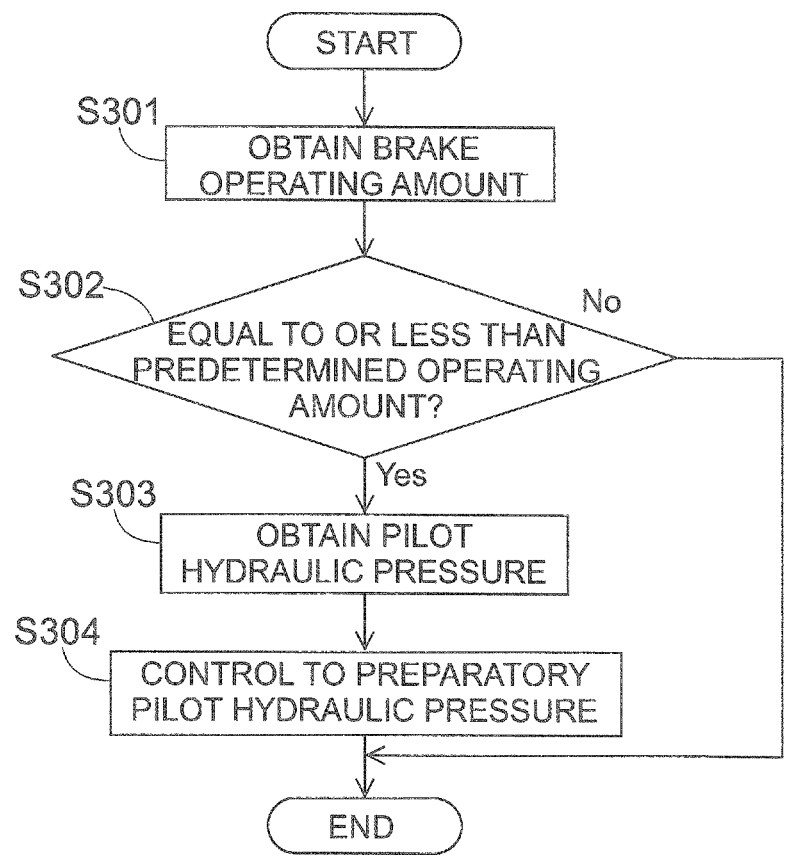
FIG. 8 is a flowchart for explaining a pre-charge control according to the third embodiment of the invention.

The pre-charge control according to the third embodiment will be explained hereinafter. As shown in FIG. 8, the brake ECU 6 obtains the information on the operating amount of the brake pedal 10 from the stroke sensor 71 and also obtains the signal from the brake switch 72 (S301). The brake ECU 6 judges whether or not the obtained operating amount (and information on whether the operation is made or not) is equal to or less than the predetermined operating amount set in advance (S302). When the brake ECU 6 judges that the obtained operating amount is "equal to or less than the predetermined operating amount" (S302: YES), the brake ECU 6 obtains the pressure value from the pressure sensor 77 (S303). In other words, the brake ECU 6 obtains the pressure in the pilot hydraulic pressure chamber 4D (pilot hydraulic pressure) (S303).

Then the brake ECU 6 controls the pressure increasing valve 42 and the pressure decreasing valve 41 so that the pilot hydraulic pressure becomes the predetermined preparatory pilot hydraulic pressure (S304). The preparatory pilot hydraulic pressure is, as similar to that explained in the first embodiment, the hydraulic pressure generated in the pilot hydraulic pressure chamber 4D, which moves the projecting portion 445b to a position immediately before being brought into contact with the ball valve 442 or to a position where the projecting portion 445b is brought into contact with the ball valve 442 but not moving the ball valve 442. If the obtained operating amount is larger than the predetermined operating amount (S302: NO), the pre-charge control is not performed.

According to the third embodiment, advantages similar to those in the first embodiment can be exhibited. Further, according to the third embodiment, since the brake ECU 6 controls the pressure increasing valve 42 and the pressure decreasing valve 41 by obtaining the pilot hydraulic pressure values, the preparatory pilot hydraulic pressure can be precisely generated in the pilot hydraulic pressure chamber 4D.

<Fourth Embodiment>

The brake control device according to the fourth embodiment is different in structure compared to the structure of the first embodiment that the brake ECU 6 predicts a generation of brake operation and the pre-charge control by the brake ECU 6 is executed based on the prediction thereby. Accordingly, such different points will be explained. The numerals or the symbols used in the first embodiment are used here to illustrate the structures similar to those of the first embodiment and the precedent explanation shall be referred to.

Figure 9:
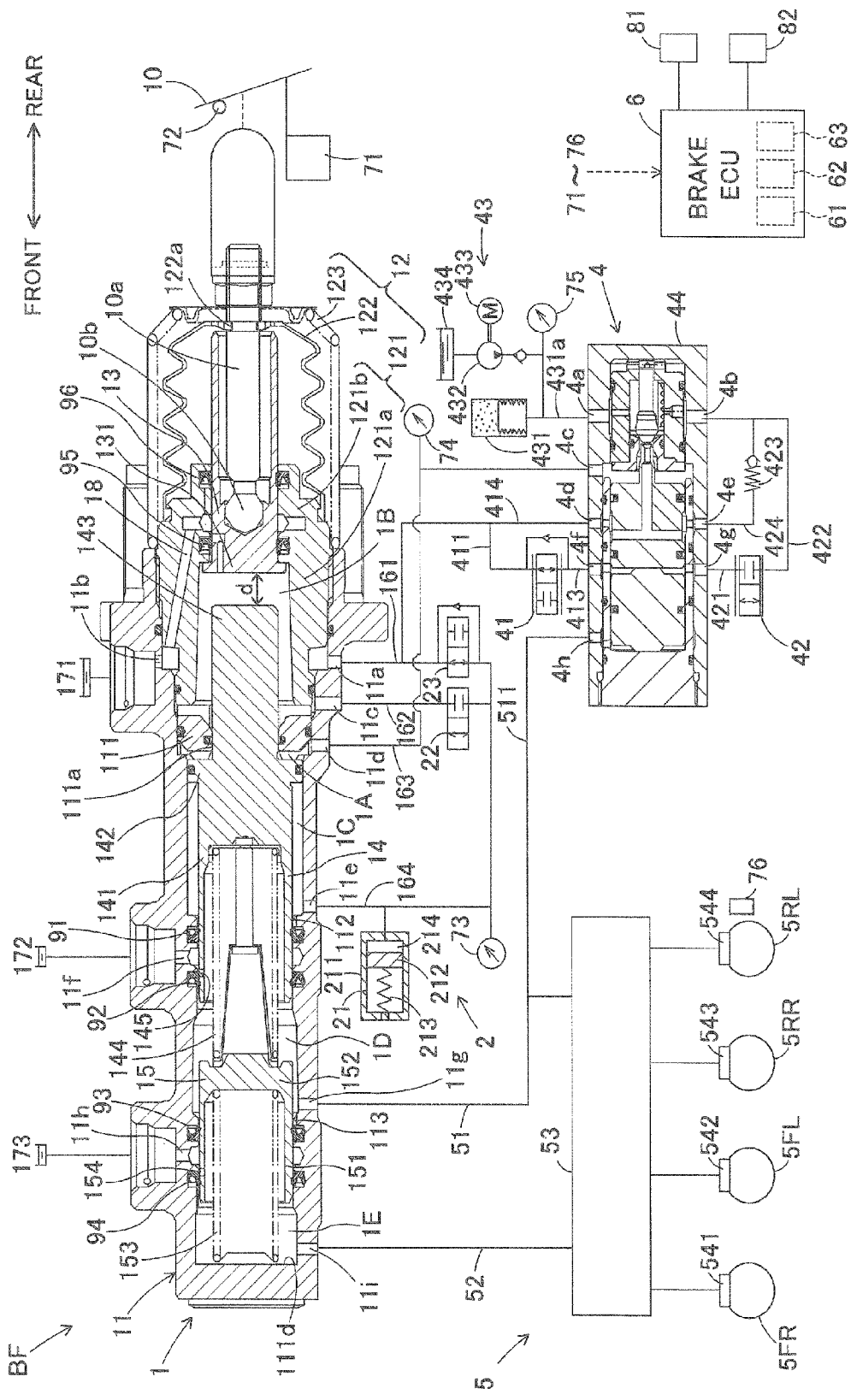
FIG. 9 is a conceptual view of the brake control device and the hydraulic pressure braking force generating device according to a fourth embodiment of the invention.

As shown in FIG. 9, the brake ECU 6 is structured to obtain the information on an operating amount of acceleration pedal (not shown) from an acceleration operating amount sensor 81 which measures the operating amount of the acceleration pedal and to obtain the information on a vehicle speed from a vehicle speed sensor 82 which measures the vehicle speed of the vehicle. The brake ECU 6 memorizes a predetermined acceleration operating amount which is a set value relative to the acceleration operating amount and a predetermined vehicle speed which is a set value relative to the vehicle speed.

The pre-charge control according to the fourth embodiment will be explained hereinafter. As shown in FIG. 10, the brake ECU 6 obtains the information on the operating amount of the brake pedal 10 from the stroke sensor 71 and also obtains the signal from the brake switch 72 (S401). The brake ECU 6 judges whether or not the obtained operating amount (and information on whether the operation is made or not) is equal to or less than the predetermined operating amount set in advance (S402). When the brake ECU 6 judges that the obtained operating amount is "equal to or less than the predetermined operating amount" (S402: YES), the brake ECU 6 obtains the acceleration operating amount from the acceleration operating amount sensor 81 and obtains the information on the vehicle speed from the vehicle speed sensor 82 (S403).

The brake ECU 6 judges whether or not the probability of performing a brake operation by a driver of the vehicle is high" based on the judgment whether or not the obtained acceleration operating amount is equal to or less than the predetermined acceleration operating amount and the judgment whether or not the obtained vehicle speed is equal to or more than the predetermined vehicle speed (S404). More specifically, the brake ECU 6 judges that the probability of performing a brake operation by a driver of the vehicle is high, when the acceleration operating amount is equal to or less than the predetermined acceleration operating amount and the vehicle speed is equal to or more than the predetermined vehicle speed. In other words, the brake ECU 6 predicts that the braking force will be applied to the vehicle wheels 5FR through 5RL at which the corresponding wheel cylinders 541 through 544 are provided when the acceleration operating amount is equal to or less than the predetermined acceleration operating amount and the vehicle speed is equal to or more than the predetermined vehicle speed. The brake ECU 6 is provided with a predicting portion 63 which predicts that the braking force will be applied to the vehicle wheels 5FR through 5RL at which the corresponding wheel cylinders 541 through 544 are provided.

When the brake ECU 6 judges that the probability of applying the braking force is high, (S404: YES), then the brake ECU 6 controls the pressure increasing valve 42 and the pressure decreasing valve 41 to thereby generate the preparatory pilot hydraulic pressure in the pilot hydraulic pressure chamber 4D (S405). The preparatory pilot hydraulic pressure is generated as similar to the case of the first embodiment by supplying the pilot hydraulic pressure chamber 4D with a predetermined amount of operating fluid. On the other hand, when the brake ECU 6 does not judge that the probability of applying the braking force is high (S404: NO), the pre-charge control is not executed. If the obtained operating amount is larger than the predetermined operating amount (S402: NO), the pre-charge control is not performed.

According to the fourth embodiment, since the brake ECU 6 predicts the probability of brake operation, the pre-charge control can be selectively executed upon the timing that such pre-charging is highly necessary. In other words, according to the fourth embodiment, in addition to the advantages of the first embodiment, more effective pre-charge control can be executed depending on the vehicle running state.

The invention is not limited to the first through fourth embodiments explained above. For example, in the fourth embodiment, the generation of the preparatory pilot hydraulic pressure can be realized by the control according to the second embodiment or the third embodiment. In other words, the fourth embodiment and other embodiments can be combined. More specifically, the step S405 in FIG. 10 can be replaced with the steps S203 and S204 in FIG. 6 or the steps S303 and S304 in FIG. 8. Further, the brake ECU 6 (predicting portion 63) may be set to judge that the probability of performing a brake operation by the driver of the vehicle is high when the acceleration operating amount is equal to or less than a predetermined acceleration operating amount or when the vehicle speed is equal to or more than a predetermined vehicle speed. Further, the prediction of occurrence of brake operation by the brake ECU 6 (predicting portion 63) may be executed based on the factors other than the acceleration operating amount and the vehicle speed. Still further, the preparatory pilot hydraulic pressure is not limited to the hydraulic pressure that moves the projecting portion 445b to a position immediately before the contact with the ball valve 442, but may be set to a hydraulic pressure that moves the projecting portion 445 to approach close to the ball valve 442.

The invention claimed is:

1. A brake control device applied to a hydraulic pressure braking force generating device equipped with a wheel cylinder which applies a braking force to a vehicle wheel of a vehicle;
   - a master cylinder which outputs a master pressure to the wheel cylinder by driving a master piston by a driving hydraulic pressure which has been inputted to a driving hydraulic pressure chamber;
   - a mechanical driving hydraulic pressure generating device which outputs the driving hydraulic pressure in response to a pilot hydraulic pressure which has been inputted to a pilot hydraulic pressure chamber; and
   - an electric pilot hydraulic pressure generating device which outputs the pilot hydraulic pressure to the pilot hydraulic pressure chamber, wherein the brake control device comprises:
   - a judging portion for judging whether or not an operating amount of a brake operating member is zero; and
   - a pilot hydraulic pressure control portion for controlling the electric pilot hydraulic pressure generating device to generate a preparatory pilot hydraulic pressure in the pilot hydraulic pressure chamber which is set to a value so that the driving hydraulic pressure is larger than an atmospheric pressure and yet equal to or less than a set load of a biasing member which biases the master piston toward an initial position thereof, when the judging portion judges that the operating amount of the brake operating member is zero.

2. The brake control device according to claim 1, further comprising:
   - a predicting portion provided for predicting an application of the braking force to the vehicle wheel at which the wheel cylinder is provided, wherein the pilot hydraulic pressure control portion generates the preparatory pilot hydraulic pressure when the application of the braking force to the vehicle wheel is predicted by the predicting portion.

3. The brake control device according to claim 1, wherein the pilot hydraulic pressure control portion controls the electric pilot hydraulic pressure generating device to supply the pilot hydraulic pressure chamber with a predetermined amount of operating fluid corresponding to the preparatory pilot hydraulic pressure.

4. The brake control device according to claim 1, further comprising:
   - a driving hydraulic pressure obtaining portion for obtaining the driving hydraulic pressure, wherein the pilot hydraulic pressure control portion controls the electric pilot hydraulic pressure generating device so that the driving hydraulic pressure obtained by the driving hydraulic pressure obtaining portion becomes a preparatory driving hydraulic pressure corresponding to the preparatory pilot hydraulic pressure.

5. The brake control device according to claim 1, further comprising:
   - a pilot hydraulic pressure obtaining portion for obtaining the pilot hydraulic pressure, wherein the pilot hydraulic pressure control portion controls the electric pilot hydraulic pressure generating device so that the pilot hydraulic pressure obtained by the pilot hydraulic pressure obtaining portion becomes the preparatory pilot hydraulic pressure.

* * * * *